United States Patent
Gavade et al.

(10) Patent No.: US 9,774,889 B2
(45) Date of Patent: Sep. 26, 2017

(54) CONTENT DELIVERY NETWORK INTEGRATION FOR HOME MEDIA CLIENT CONTENT

(71) Applicant: Verizon Patent and Licensing Inc., Arlington, VA (US)

(72) Inventors: Sameer Gavade, Irving, TX (US); Sanjay Ahuja, Irving, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 50 days.

(21) Appl. No.: 14/850,268

(22) Filed: Sep. 10, 2015

(65) Prior Publication Data
US 2017/0078714 A1 Mar. 16, 2017

(51) Int. Cl.
- *H04N 5/445* (2011.01)
- *H04N 21/231* (2011.01)
- *H04N 21/436* (2011.01)
- *H04N 21/433* (2011.01)

(52) U.S. Cl.
CPC . *H04N 21/23116* (2013.01); *H04N 21/23106* (2013.01); *H04N 21/433* (2013.01); *H04N 21/43615* (2013.01)

(58) Field of Classification Search
CPC ....... H04N 21/23116; H04N 21/43615; H04N 21/23106; H04N 21/433
USPC .......................................................... 725/80
See application file for complete search history.

(56) References Cited

U.S. PATENT DOCUMENTS

| | | | | |
|---|---|---|---|---|
| 8,973,084 B2* | 3/2015 | Saraf | .................. | H04N 21/4334 725/133 |
| 2006/0230176 A1* | 10/2006 | Dacosta | ............ | H04L 29/06027 709/235 |
| 2009/0150943 A1* | 6/2009 | Vasudevan | ......... | H04N 21/2385 725/86 |
| 2010/0058405 A1* | 3/2010 | Ramakrishnan | ... | H04N 7/17318 725/97 |
| 2010/0086020 A1* | 4/2010 | Schlack | ................ | H04L 67/322 375/240.01 |
| 2010/0161756 A1* | 6/2010 | Lewis | ................. | H04N 7/17318 709/217 |
| 2011/0188439 A1* | 8/2011 | Mao | .................... | H04N 7/17318 370/312 |
| 2011/0191445 A1* | 8/2011 | Dazzi | ...................... | G06F 15/16 709/219 |

(Continued)

*Primary Examiner* — Michael B Pierorazio

(57) ABSTRACT

A device may provide information identifying one or more items of content stored by a home media client. The device may receive a request for content, of the one or more items of content, stored by the home media client. The home media client may store a first copy of the content. The device may identify a second copy of the content based on the request for the content. The second copy of the content may be stored by a storage device of a content delivery network or may be stored by the home media client without being stored by the storage device of the content delivery network. The device may cause the second copy of the content to be provided via the content delivery network as a response to the request regardless of whether the second copy of the content is stored by the storage device of the content delivery network or by the home media client.

20 Claims, 7 Drawing Sheets

(56) References Cited

U.S. PATENT DOCUMENTS

| 2013/0132986 A1* | 5/2013 | Mack | H04L 65/605 |
| | | | 725/14 |
| 2014/0282777 A1* | 9/2014 | Gonder | H04L 65/605 |
| | | | 725/109 |
| 2015/0263916 A1* | 9/2015 | Phillips | H04L 43/08 |
| | | | 709/224 |

* cited by examiner

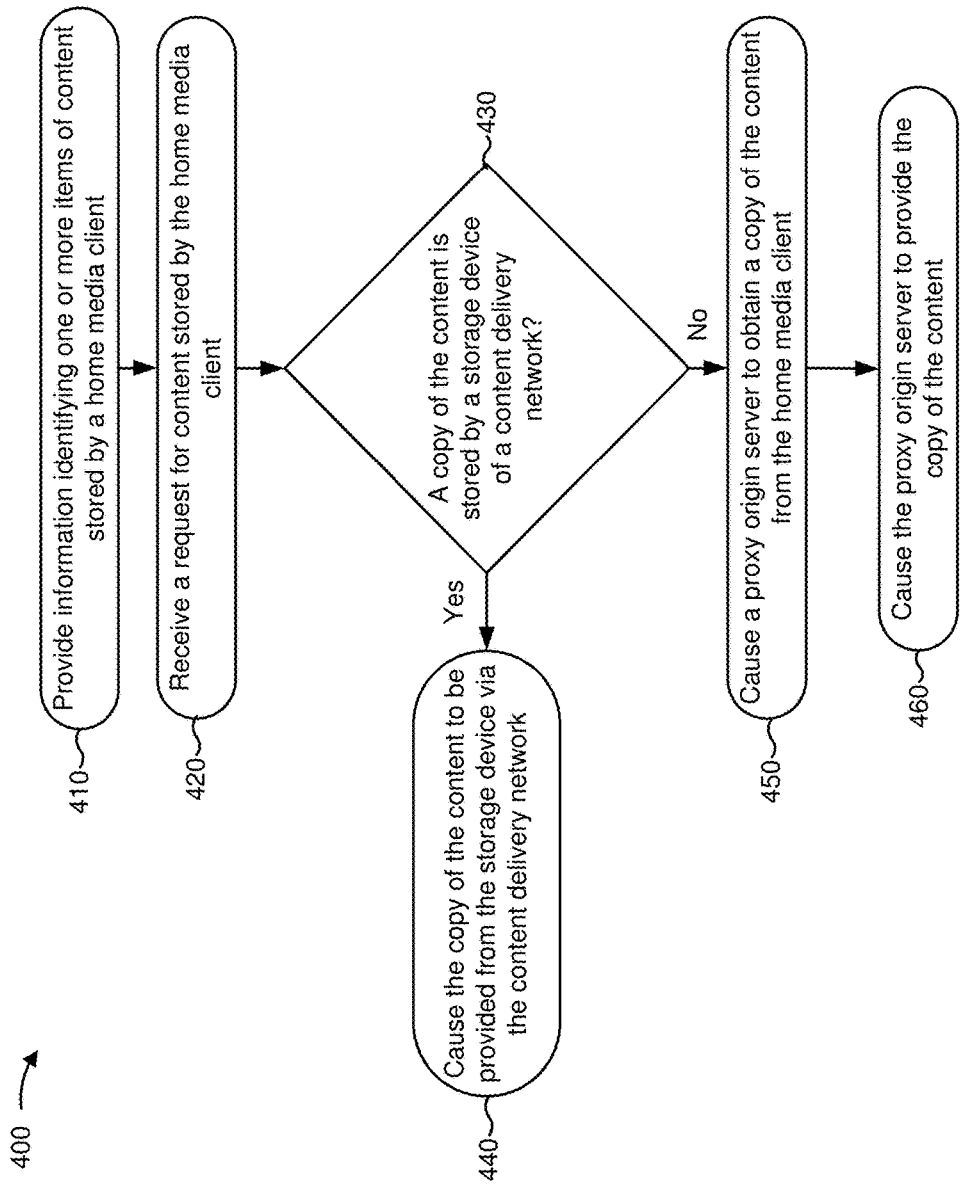

CONTENT DELIVERY NETWORK INTEGRATION FOR HOME MEDIA CLIENT CONTENT

BACKGROUND

A home media client may be utilized to record and store content. For example, a digital video recorder may record content from a set-top box, and may store the recorded content for playback. The home media client may provide the recorded content for playback via a display device at a different time from recording the content, thereby facilitating time-shifting of content viewing. The home media client may provide the recorded content for playback via a network connection with a user device located at a different location than the set-top box, thereby facilitating place-shifting of content viewing.

BRIEF DESCRIPTION OF THE DRAWINGS

FIG. 4 is a flow chart of an example process for utilizing a content delivery network to facilitate providing content stored via a home media client.

DETAILED DESCRIPTION OF PREFERRED EMBODIMENTS

The following detailed description of example implementations refers to the accompanying drawings. The same reference numbers in different drawings may identify the same or similar elements.

Content may be provided from a content server for display. For example, a set-top box may receive the content from the content server and may cause the content to be provided via a display device. A home media client may store a copy of the content via a data structure and may provide the copy of the content for display. For example, the home media client may subsequently provide the copy of the content to facilitate time-shifting (e.g., playback of content at a different time from when the content was provided by the content server). Similarly, the home media client may provide the copy of the content to a user device via a network connection to facilitate place-shifting (e.g., playback of content at a location different from where the content was provided by the content server). However, providing the copy of the content via the network connection with the home media client may be network resource intensive. Implementations, described herein, may utilize a content delivery network (CDN) to cache content and/or provide content, thereby facilitating time-shifting and/or place shifting. In this way, the CDN reduces network utilization relative to utilizing an Internet connection with a home media client.

FIGS. 1A-1D are diagrams of an overview of an example implementation 100 described herein. FIGS. 1A-1D show an example of utilizing a content delivery network to facilitate providing content stored via a home media client.

Figure 1A:
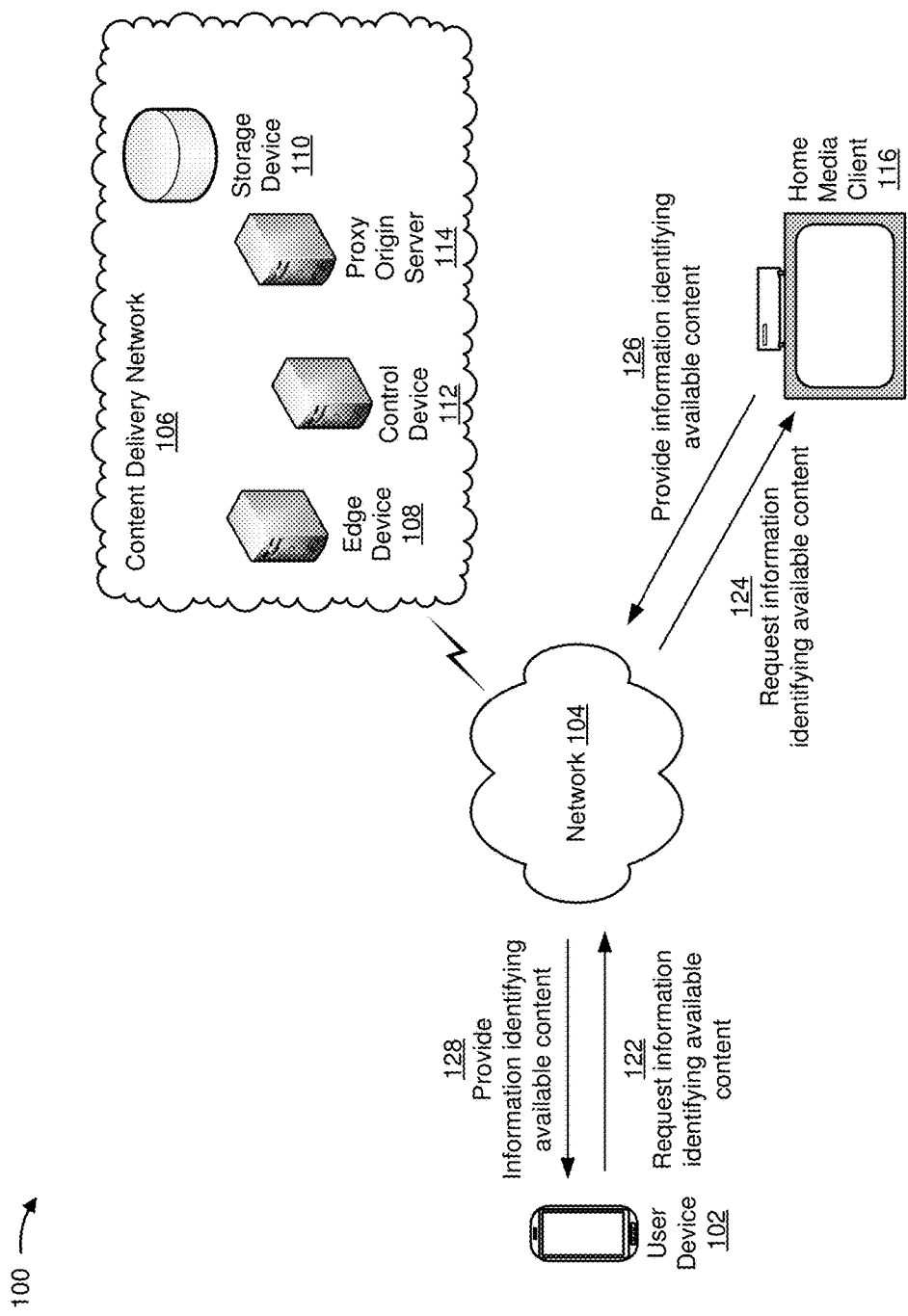
FIGS. 1A-1D are diagrams of an overview of an example implementation described herein.

As shown in FIG. 1A, user device 102 may connect to network 104, which may connect to content delivery network 106. Content delivery network 106 may include edge device 108, storage device 110, control device 112, and proxy origin server 114. Home media client 116 may connect to user device 102 via network 104 and may connect to proxy origin server 114. As shown by reference numbers 122 and 124, user device 102 may request information identifying available content stored via home media client 116. For example, user device 102 may request information identifying a streaming video file (e.g., a television show, a movie, a web video, etc.), a streaming audio file (e.g., a song, an album, a radio program, etc.), or the like that can be provided by home media client 116 to user device 102 via network 104. As shown by reference numbers 126 and 128, home media client 116 may provide, to user device 102 via network 104, information identifying the available content.

Figure 1B:
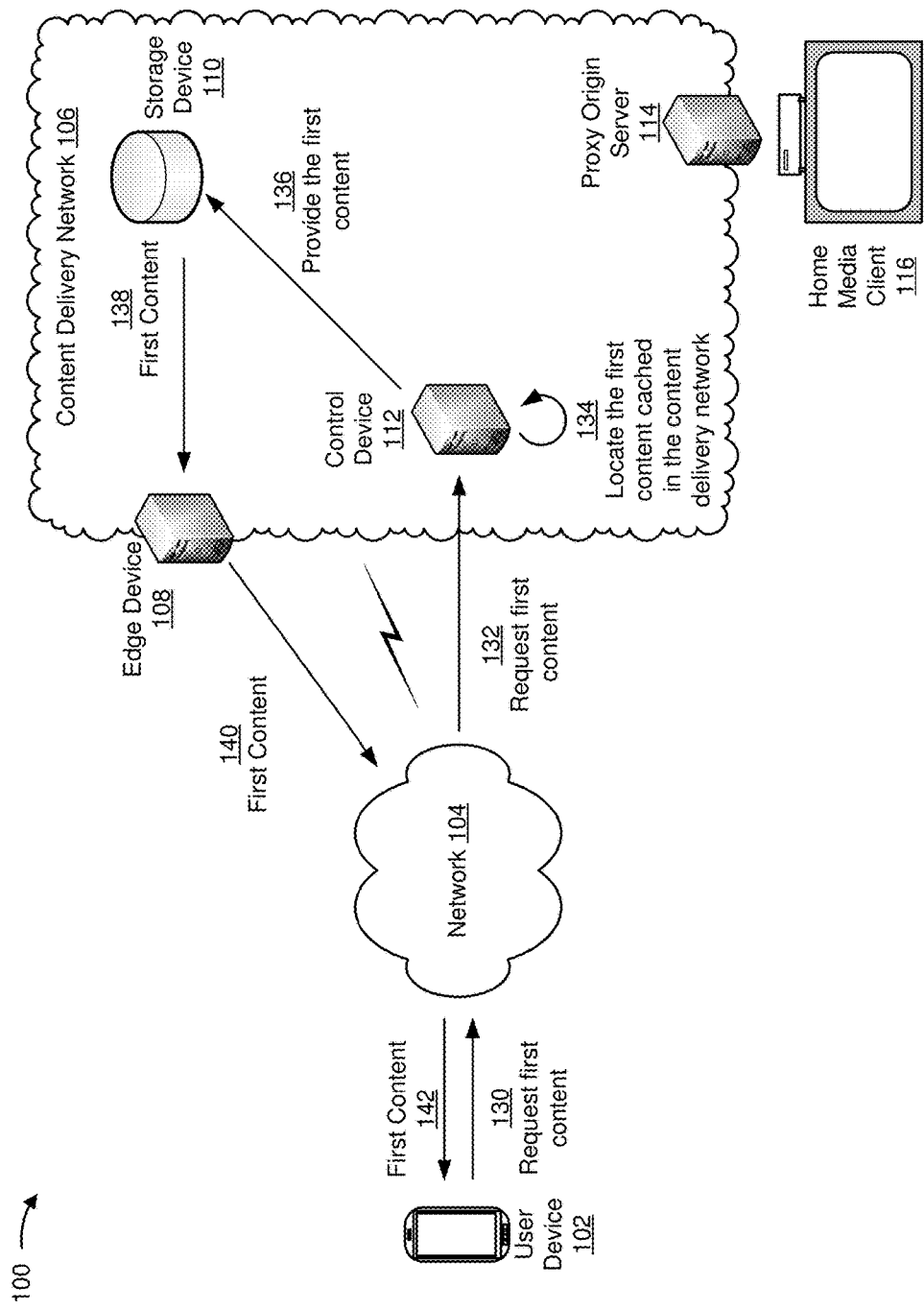

As shown in FIG. 1B, and by reference numbers 130 and 132, user device 102 may request first content based on the information identifying the available content. For example, user device 102 may request that a particular television program that is stored via home media client 116 be provided (e.g., user device 102 may provide the request to control device 112, to home media client 116, which may route the request to control device 112, or the like). As shown by reference number 134, control device 112 may receive the request for the first content and may locate a copy of the first content cached in content delivery network 106. For example, control device 112 may determine that storage device 110 stores the copy of the first content. As shown by reference number 136, control device 112 may transmit a message to storage device 110 to cause storage device 110 to provide the first content to user device 102. In another example, control device 112 may transmit a message to user device 102 to facilitate user device 102 receiving the first content from storage device 110.

As further shown in FIG. 1B, and by reference numbers 138, 140, and 142, storage device 110 may provide the first content to user device 102 via edge device 108. For example, storage device 110 may provide the first content to user device 102 based on receiving the message from control device 112. In another example, when control device 112 transmits a message, to user device 102, identifying a set of portions of the first content that are obtainable from storage device 110, storage device 110 may provide the first content based on receiving a set of requests for the set of portions of the first content. In this way, control device 112 facilitates distribution of content, selected by user device 102 based on information identifying available content from home media client 116, from edge device 108 of content delivery network 106, thereby reducing network resource utilization and improving load balancing relative to providing the content directly from home media client 116.

Figure 1C:
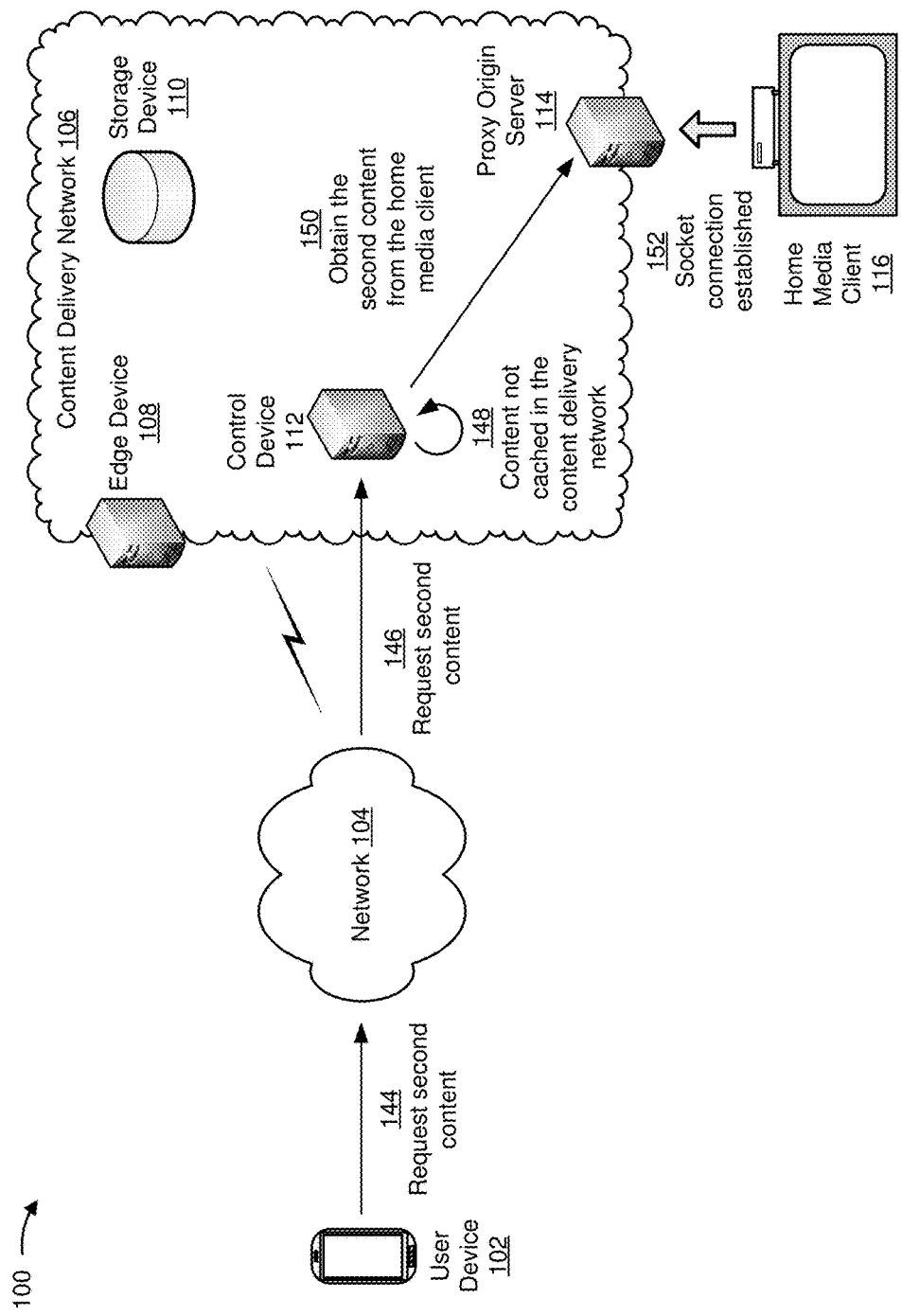

As shown in FIG. 1C, and by reference numbers 144 and 146, user device 102 may request second content based on the information identifying the available content. For example, user device 102 may request that home media client 116 provide a particular radio program that is stored via home media client 116. As shown by reference number 148, control device 112 may receive the request for the second content, and may determine that a copy of the second content is not cached in content delivery network 106. As shown by reference number 150, control device 112 transmits a message to proxy origin server 114 to cause proxy origin server 114 to obtain a copy of the second content from home media client 116. As shown by reference number 152, proxy origin server 114 may establish a socket connection with which to obtain the copy of the second content from home media client 116.

Figure 1D:
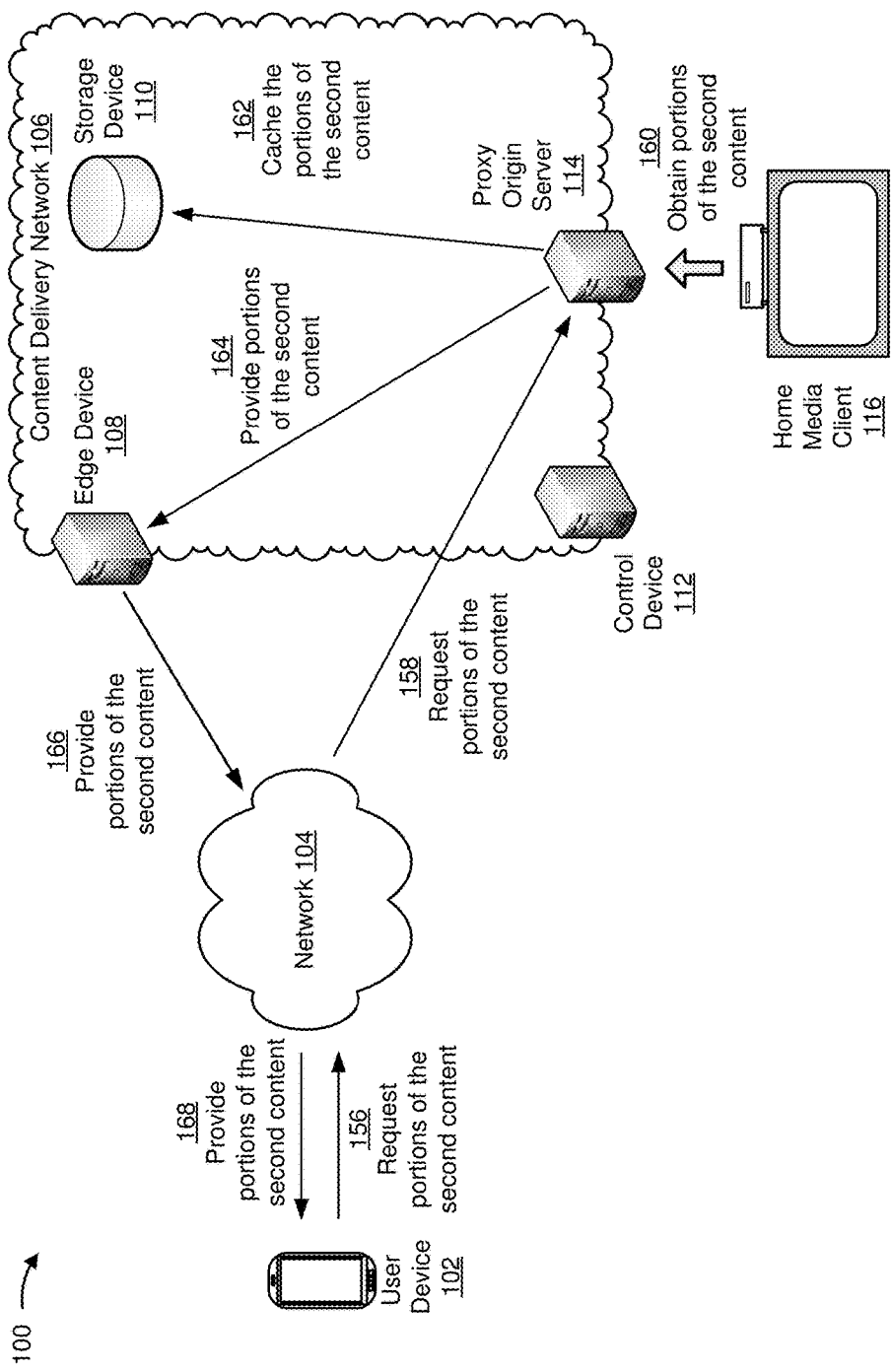

As shown in FIG. 1D, and by reference numbers 156 and 158, user device 102 requests one or more portions of the second content. For example, control device 112 may provide information identifying a set of portions of the second content that are obtainable from home media client 116. In this case, user device 102 may request the one or more portions, of the set of portions, of the second content be provided. In another example, proxy origin server 114 may be caused to establish the socket connection with home media client 116 based on user device 102 requesting the one or more portions of the second content. In another example, user device 102 may transmit the request for the one or more portions of the second content to another device (e.g., edge device 108, control device 112, or the like,), and the other device may request that proxy origin server 114 establish the socket connection to provide the one or more portions of the second content.

As further shown in FIG. 1D, and by reference number 160, proxy origin server 114 obtains the one or more portions of the second content from home media client 116. As shown by reference number 162, proxy origin server 114 provides the one or more portions of the second content to storage device 110 for storage in content delivery network 106. In this way, control device 112 facilitates utilization of content delivery network 106 to store a copy of the second content and provide the copy of the second content when the second content is subsequently requested. Moreover, based on storing the copy of the second content via content delivery network 106, control device 112 facilitates reduced network utilization and improved load balancing when another user device 102 requests the second content and the copy of the second content is provided from storage device 110, relative to the other user device 102 receiving the copy of the second content directly from home media client 116.

As further shown in FIG. 1D, and by reference numbers 164, 166, and 168, proxy origin server 114 provides the one or more portions of the second content to user device 102 (e.g., via edge device 108). In this way, control device 112 facilitates providing a copy of the second content from home media client 116 when the second content is not already stored via content delivery network 106. Moreover, by utilizing content delivery network 106 to obtain and provide the second content, control device 112 may facilitate reduced network usage and improved load balancing relative to user device 102 requesting and obtaining the second content directly from home media client 116.

In this way, control device 112 facilitates providing content, which is stored via home media client 116, from content delivery network 106 when the content is stored via content delivery network 106, thereby reducing network resource utilization relative to providing the content directly from home media client 116. Moreover, when the content is not stored via content delivery network 106, control device 112 facilitates providing the content from home media client 116 and caching the content via content delivery network 106 for subsequent utilization, thereby facilitating reducing network utilization of a subsequent request for the content relative to providing the content from home media client 116 without caching the content.

Figure 2:
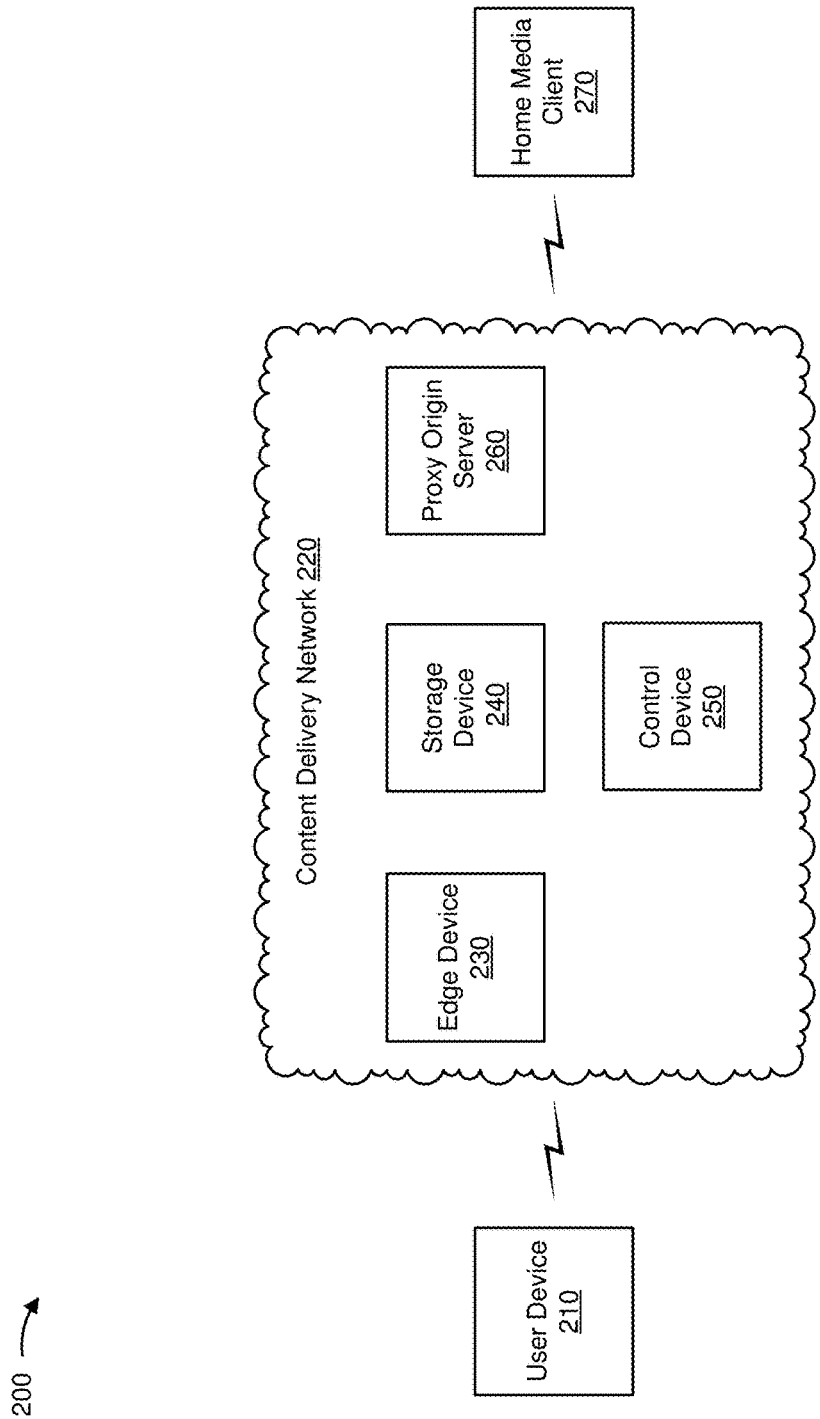
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a content delivery network 220, an edge device 230, a storage device 240, a control device 250, a proxy origin server 260, and a home media client 270. Devices of environment 200 may interconnect via wired connections, wireless connections, or a combination of wired and wireless connections.

User device 210 may include one or more devices capable of receiving, generating, storing, processing, and/or providing information associated with playback of content (e.g., audio content, video content, or the like). For example, user device 210 may include a communication and/or computing device, such as a mobile phone (e.g., a smart phone, a radiotelephone, etc.), a computer (e.g., a desktop computer, a laptop computer, a tablet computer, a handheld computer, etc.), a gaming device, a wearable communication device (e.g., a smart wristwatch, a pair of smart eyeglasses, etc.), or a similar type of device. In some implementations, user device 210 may include a user interface for requesting particular content provided from content delivery network 220 and playing the particular content when received from edge device 230. In some implementations, user device 210 corresponds to user device 102 shown in FIGS. 1A-1D. In some implementations, user device 210 may receive information from and/or transmit information to another device in environment 200.

Content delivery network 220 may include one or more wired and/or wireless networks. For example, content delivery network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, content delivery network 220 may include one or more network devices (e.g., one or more particular devices associated with receiving, storing, and/or providing content). For example, content delivery network 220 may include edge device 230, storage device 240, control device 250, proxy origin server 260, or the like. In some implementations, content delivery network 220 corresponds to content delivery network 106 shown in FIGS. 1A-1D.

Edge device 230 may include one or more devices capable of receiving, generating, storing, processing, and/or providing information associated with playback of content. For example, edge device 230 may include a server (e.g., a CDN edge server) or a network device (e.g., a CDN edge router or gateway) that receives content, and provides the content to user device 210. In some implementations, multiple edge devices 230 may be associated with content delivery network 220. In some implementations, edge device 230 corresponds to edge device 108 shown in FIGS. 1A-1D. In some implementations, edge device 230 may receive information from and/or transmit information to another device in environment 200.

Storage device 240 may include one or more devices capable of receiving, generating, storing, processing, and/or providing information associated with playback of content. For example, storage device 240 may include a server, a cloud storage device, or the like, that includes a data structure for storing content, and may provide requested content to edge device 230. In some implementations, storage device 240 may receive content from proxy origin server 260 that is provided for storage and/or receive a request from control device 250 and/or edge device 230 for stored content. In some implementations, storage device 240 corresponds to storage device 110 shown in FIGS. 1A-1D.

In some implementations, storage device 240 may receive information from and/or transmit information to another device in environment 200.

Control device 250 may include one or more devices capable of receiving, generating, storing, processing, and/or providing information associated with providing content. For example, control device 250 may include a server, a gateway, a router, a hub, a switch, or a similar device. Control device 250 may cause devices of content delivery network 220 (e.g., edge device 230, storage device 240, proxy origin server 260, or the like) to obtain content, store content, provide content, or the like. In some implementations, control device 250 corresponds to control device 112 shown in FIGS. 1A-1D. In some implementations, control device 250 may receive information from and/or transmit information to another device in environment 200.

Proxy origin server 260 may include one or more devices capable of storing, processing, and/or routing information. In some implementations, proxy origin server 260 may include a communication interface that allows proxy origin server 260 to receive information from and/or transmit information to other devices in environment 200. In some implementations, proxy origin server 260 may include a communication interface that facilitates establishment of a socket connection (e.g., a connection to a port and/or an Internet protocol address) or another type of connection with home media client 270. In some implementations, proxy origin server 260 corresponds to proxy origin server 114 shown in FIGS. 1A-1D.

Home media client 270 may include one or more devices capable of storing, processing, and/or routing content. For example, home media client 270 may include a streaming home media client, such as a digital video recorder, a set-top box, a home media server, or the like. In some implementations, home media client 270 may provide content in multiple segments. Each segment may include a subset of the content. For example, home media client 270 may provide, to proxy origin server 260, a first portion of the content associated with a first time interval, a second portion of the content associated with a second time interval, or the like. In some implementations, home media client 270 may generate information identifying the portions of the content, such as a playlist file, a manifest, file, or the like, and may provide the information to facilitate provision of the content. In some implementations, home media client 270 corresponds to home media client 116 shown in FIGS. 1A-1D. In some implementations, home media client 270 may include a communication interface that allows home media client 270 to receive information from and/or transmit information to other devices in environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although edge device 230 and control device 250 are described, herein, as separate devices, edge device 230 and control device 250 may be implemented in a single device. Similarly, although edge device 230 and storage device 240 are described, herein, as separate devices, edge device 230 and storage device 240 may be implemented in a single device. Additionally, or alternatively, a set of devices (e.g., one or more devices) of environment 200 may perform one or more functions described as being performed by another set of devices of environment 200.

Figure 3:
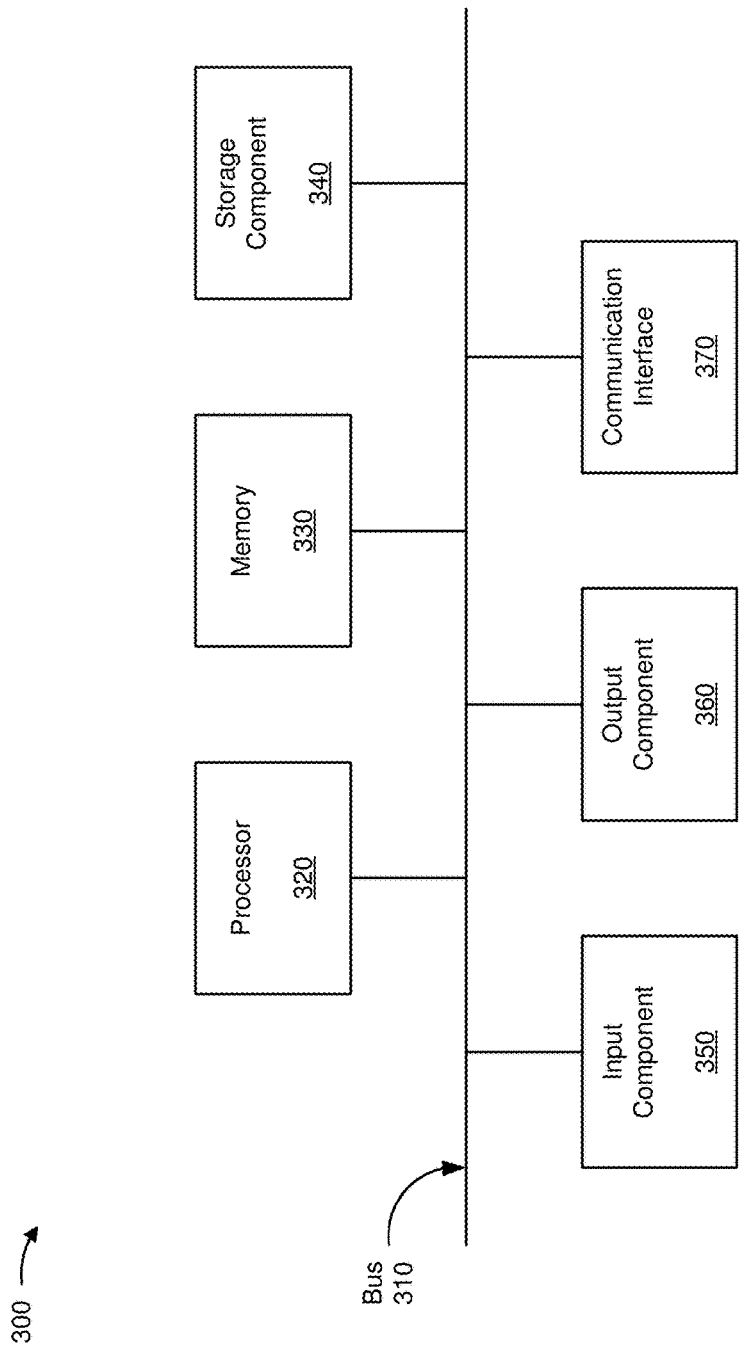
FIG. 3 is a diagram of example components of one or more devices of FIG. 2.

FIG. 3 is a diagram of example components of a device 300. Device 300 may correspond to user device 210, edge device 230, storage device 240, control device 250, proxy origin server 260, and/or home media client 270. In some implementations, user device 210, edge device 230, storage device 240, control device 250, proxy origin server 260, and/or home media client 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing a content delivery network to facilitate providing content stored via a home media client. In some implementations, one or more process blocks of FIG. 4 may be performed by control device 250. In some implementations, one or more process blocks of FIG. 4 may be performed by another device or a group of devices separate from or including control device 250, such as user device 210, edge device 230, storage device 240, proxy origin server 260, and home media client 270.

As shown in FIG. 4, process 400 may include providing information identifying one or more items of content stored by a home media client (block 410). For example, control device 250 may provide information identifying one or more items of content stored by home media client 270, such as audio content, video content, or the like. In some implementations, control device 250 may request the information identifying the one or more items of content from home media client 270, and may provide the information to user device 210. For example, control device 250 may receive a request from user device 210 for information identifying the one or more items of content, may request the information from home media client 270, may receive the information from home media client 270, and may provide the information to user device 210 to fulfill the request. In some implementations, user device 210 may request the information identifying the one or more items of content from home media client 270 and may receive the information identifying the one or more items of content from home media client 270.

As further shown in FIG. 4, process 400 may include receiving a request for content stored by the home media client (block 420). For example, control device 250 may receive, from user device 210, the request for content stored by home media client 270. In some implementations, control device 250 may receive information identifying the content when receiving the request. For example, control device 250 may receive, from user device 210, information identifying a content identifier, such as a title, a video identifier, an audio identifier, or the like. Additionally, or alternatively, control device 250 may receive information identifying a network address identifier associated with a copy of the content stored by home media client 270. In this case, control device 250 may request information identifying the content from home media client 270 based on the network address identifier.

As further shown in FIG. 4, process 400 may include determining whether a copy of the content is stored by a storage device of a content delivery network (block 430). For example, control device 250 may determine whether a copy of the content is stored by storage device 240 of content delivery network 220. In some implementations, control device 250 may obtain information identifying available content of content delivery network 220 from a data structure. For example, control device 250 may periodically update a data structure storing information identifying content stored by storage device 240, and may access the data structure to determine whether a copy of the content is stored by storage device 240. Additionally, or alternatively, control device 250 may request that storage device 240 provide information indicating whether storage device 240 stores a copy of the content.

As further shown in FIG. 4, if a copy of the content is stored by the storage device of the content delivery network (block 430—YES), process 400 may include causing the copy of the content to be provided from the storage device via the content delivery network (block 440). For example, when control device 250 determines that a copy of the content is stored by storage device 240, control device 250 may cause the copy of the content to be provided from storage device 240 to user device 210 via content delivery network 220 (e.g., via edge device 230). In some implementations, control device 250 may transmit a message to storage device 240 to cause storage device 240 to provide the copy of the content to user device 210. For example, control device 250 may transmit the message to storage device 240 indicating that storage device 240 is to provide the copy of the content to user device 210 (e.g., via edge device 230). In this way, control device 250 facilitates streaming of a copy of content, which is stored via home media client 270, from content delivery network 220, thereby reducing network utilization and improving load balancing relative to streaming the content directly from home media client 270.

In some implementations, control device 250 may transmit a message to user device 210 to cause storage device 240 to provide the copy of the content to user device 210. For example, control device 250 may provide information to user device 210 identifying a network address with which user device 210 can communicate to receive the copy of the content (e.g., a network address associated with storage device 240). In some implementations, control device 250 may provide information identifying a set of portions of the copy of the content. For example, control device 250 may provide information identifying the set of portions of the copy of the content (e.g., a set of network address identifiers identified by a playlist file, a manifest file, or the like) to user device 210, and user device 210 may request one or more portions of the content based on the information identifying the set of portions of the copy.

Additionally, or alternatively, control device 250 may transmit a message to user device 210 to cause edge device 230 to provide the copy of the content to user device 210. For example, control device 250 may provide information to user device 210 identifying a network address with which user device 210 can communicate to receive the copy of the content (e.g., a network address that directs to edge device 230). In some implementations, edge device 230 may provide the copy of the content from a data structure of edge device 230, request the copy of the content from storage device 240 and provide the copy of the content, or the like. For example, when edge device 230 stores the copy of the content, edge device 230 may provide the copy of the content based on a request from user device 210. Alternatively, when edge device 230 does not store the copy of the content, edge device 230 may request the copy of the content from storage device 240 (e.g., based on a request from user device 210), receive the copy of the content from storage device 240, and provide the copy of the content as a response to the request from user device 210.

As further shown in FIG. 4, if the copy of the content is not stored by the storage device of the content delivery network (block 430—NO), process 400 may include causing a proxy origin server to obtain a copy of the content from the home media client (block 450). For example, when control device 250 determines that a copy of the content is not stored by storage device 240, control device 250 may cause proxy origin server 260 to obtain the copy of the content from home media client 270. In some implementations, control device 250 may cause proxy origin server 260 to establish a connection to home media client 270 with which to obtain the copy of the content. For example, control device 250 may cause proxy origin server 260 to establish a socket connection with home media client 270, and may cause the socket connection to remain established until the copy of the content is obtained from home media client 270.

In some implementations, control device 250 may cause proxy origin server 260 to obtain the copy of the content via the connection with home media client 270 based on transmitting a message to proxy origin server 260. For example, control device 250 may transmit a message to proxy origin server 260 indicating that proxy origin server 260 is to obtain the copy of the content, and proxy origin server 260 may establish a connection with home media client 270 to obtain the copy of the content based on receiving the message.

In some implementations, control device 250 may transmit a message to user device 210 to cause proxy origin server 260 to obtain the copy of the content. For example, control device 250 may provide information identifying a set of portions of the copy of the content to user device 210 (e.g., a network address that directs to proxy origin server 260), and user device 210 may request that one or more portions of the copy of the content from proxy origin server 260. In this case, proxy origin server 260 may receive the request for the one or more portions of the copy of the content from user device 210 and may establish a network connection with home media client 270 to obtain the one or more portions of the copy of the content based on receiving the request.

As further shown in FIG. 4, process 400 may include causing the proxy origin server to provide the copy of the content (block 460). For example, control device 250 may cause proxy origin server 260 to provide the copy of the content to user device 210 (e.g., via content delivery network 220 and edge device 230) based on providing user device 210 information identifying a location of the copy of the content (e.g., a network address associated with proxy origin server 260). Additionally, or alternatively, control device 250 may cause proxy origin server 260 to provide the copy of the content based on transmitting a message to proxy origin server 260 causing proxy origin server 260 to obtain the copy of the content. Additionally or alternatively, control device 250 may cause proxy origin server 260 to provide the copy of the content to user device 210 based on transmitting a first message to cause proxy origin server 260 to obtain the copy of the content and a second message to cause proxy origin server 260 to provide the copy of the content to user device 210. In this way, control device 250 utilizes content delivery network 220 to provide content stored via home media client 270, thereby reducing network utilization and improving load balancing relative to home media client 270 streaming content directly to user device 210.

In some implementations, control device 250 may cause proxy origin server 260 to provide the copy of the content for storage. For example, control device 250 may cause proxy origin server 260 to provide the copy of the content to storage device 240, and storage device 240 may store the copy of the content via a data structure, a cache, or the like. In this way, control device 250 reduces network utilization for a subsequent request for a copy of the content relative to causing the copy of the content to be provided from home media client 270 in response to each request for a copy of the content. In some implementations, control device 250 may cause proxy origin server 260 to provide the copy of the content to multiple storage devices 240 and/or multiple edge devices 230. For example, control device 250 may cause proxy origin server 260 to provide the copy of the content to a first storage device 240 associated with providing the copy of the content to user devices 210 in a first geographic location and to a second storage device 240 associated with providing the copy of the content to user devices 210 in a second geographic location, thereby facilitating load balancing and reducing network utilization on subsequent requests for the content relative to causing the copy of the content to be stored via a single storage device 240.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, control device 250 utilizes content delivery network 220 to facilitate delivery of content associated with home media client 270, thereby reducing network utilization and improving load balancing relative to delivery of content directly from home media client 270 to user device 210.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      provide information identifying one or more items of content stored by a home media client to a user device;
      receive a request from the user device for an item of content, of the one or more items of content, stored by the home media client,
         the home media client storing a first copy of the item of content outside of a content delivery network;
      determine that another copy of the item of content is not stored via a storage device of the content delivery network;
      provide, based on determining that the other copy of the item of content is not stored via the storage device of the content delivery network, information identifying the first copy of the item of content to the user device,
         the user device providing the information identifying the first copy of the item of content to a particular device of the content delivery network;
      cause a second copy of the item of content to be provided for storage via the storage device based on providing information identifying the first copy of the item of content to the user device,
         the particular device of the content delivery network obtaining the first copy of the item of content from the home media client; and
      cause the item of content to be provided to the user device as a response to the request,
         the particular device of the content delivery network providing the second copy of the item of content to the user device.

2. The device of claim 1, where the one or more processors are further to:
   cause a connection to be established for the particular device of the content delivery network and the home media client; and
   where the one or more processors, when causing the second copy of the item of content to be provided, are to:
      cause the particular device to provide the second copy of the item of content via the connection.

3. The device of claim 2, where the connection comprises a socket connection.

4. The device of claim 1, where the one or more processors are further to:
   receive another request for the item of content after causing the second copy of the item of content to be provided for storage via the storage device; and
   cause the second copy of the item of content to be provided by the storage device as a response to the other request for the item of content.

5. The device of claim 1, where the home media client is a set-top box.

6. The device of claim 1, where the item of content comprises a first portion and a second portion,
   the first portion being associated with a first time interval of the item of content, and
   the second portion being associated with a second time interval of the item of content, and
   where the information identifying the first copy of the item of content comprises information identifying at least one of the first portion or the second portion.

7. The device of claim 1, where the one or more processors, when causing the second copy of the item of content to be provided for storage via the storage device, are to:
   cause the second copy of the item of content to be provided for storage in a first storage device in a first geographic region and a second storage device in a second geographic region.

8. A computer-readable medium storing instructions, the instructions comprising:
   one or more instructions that, when executed by one or more processors, cause the one or more processors to:
      receive a request for an item of content, of one or more items of content, stored by a home media client from a user device,
         the home media client storing a first copy of the item of content outside of a content delivery network, and
         the request being received after the user device receives information identifying one or more items of content stored by the home media client,
            the one or more items of content including the item of content;
      determine that another copy of the item of content is not stored via a storage device of the content delivery network;
      provide, based on determining that the other copy of the item of content is not stored via the storage device of the content delivery network, information identifying the first copy of the item of content to the user device,
         the user device providing the information identifying the first copy of the item of content to a particular device of the content delivery network;
      cause a second copy of the item of content to be provided for storage via the storage device based on providing information identifying the first copy of the item of content to the user device,
the particular device of the content delivery network obtaining the first copy of the item of content from the home media client; and
cause the item of content to be provided to the user device as a response to the request,
the particular device of the content delivery network providing the second copy of the item of content to the user device.

9. The computer-readable medium of claim 8, where the one or more instructions, that cause the one or more processors to cause the item of content to be provided to the user device, cause the one or more processors to:
cause the item of content to be provided to the user device via the storage device.

10. The computer-readable medium of claim 8, where the storage device comprises a first storage device and a second storage device,
the first storage device being associated with providing stored content to user devices associated with a first geographic location, and
the second storage device being associated with providing stored content to user devices associated with a second geographic location,
the second geographic location being different from the first geographic location.

11. The computer-readable medium of claim 8, where the one or more instructions, that cause the one or more processors to cause the item of content to be provided to the user device, are to:
cause the item of content to be provided to the user device via an edge device of the content delivery network.

12. The computer-readable medium of claim 8, where the one or more instructions, when executed by the one or more processors, are further to:
receive another request for the item of content;
locate the second copy of the item of content stored via the storage device based on receiving the other request for the item of content; and
cause the second copy of the item of content to be provided from the storage device as a response to the other request.

13. The computer-readable medium of claim 8, where the home media client is a set-top box.

14. The computer-readable medium of claim 8, where the one or more instructions, when executed by the one or more processors, are further to:
cause a socket connection to be established for the particular device of the content delivery network and the home media client; and
where the one or more instructions, that cause the second copy of the item of content to be provided, are to:
cause the particular device to provide the second copy of the item of content via the socket connection.

15. A method, comprising:
receiving, by a device, a request for an item of content stored by a home media client from a user device,
the home media client storing a first copy of the item of content outside of a content delivery network, and
the request being received after the user device receives information identifying one or more items of content stored by the home media client,
the one or more items of content including the item of content;
determining, by the device, that a second copy of the item of content is not stored via a storage device of the content delivery network;
providing, by the device and based on determining that the second copy of the item of content is not stored via the storage device of the content delivery network, information identifying the first copy of the item of content to the user device,
the user device providing the information identifying the first copy of the item of content to a particular device of the content delivery network;
causing, by the device, the second copy of the item of content to be provided for storage via the storage device based on providing information identifying the first copy of the item of content to the user device,
the particular device of the content delivery network obtaining the first copy of the item of content from the home media client; and
causing, by the device, the item of content to be provided to the user device as a response to the request,
the particular device of the content delivery network providing the second copy of the item of content to the user device.

16. The method of claim 15, further comprising:
providing the information identifying the one or more items of content stored by the home media client; and
where receiving the request for the item of content comprises:
receiving the request for the item of content based on providing the information identifying the one or more items of content.

17. The method of claim 15, further comprising:
causing a connection to be established for the particular device of the content delivery network and the home media client; and
where causing the second copy of the item of content to be provided comprises:
causing the particular device to provide the second copy of the item of content via the connection.

18. The method of claim 17, where the connection comprises a socket connection.

19. The method of claim 15, further comprising:
receiving another request for the item of content after causing the second copy of the item of content to be provided for storage via the storage device; and
causing the second copy of the item of content to be provided by the storage device as a response to the other request for the item of content.

20. The method of claim 15, where the home media client is a set-top box.

* * * * *